United States Patent [19]
Villani et al.

[11] Patent Number: 6,089,510
[45] Date of Patent: Jul. 18, 2000

[54] MAGNETIC SYSTEMS AND METHODS FOR REALIZING SPACECRAFT MANEUVERS

[75] Inventors: Daniel D. Villani, Long Beach; Peter B. Landecker, Manhattan Beach, both of Calif.

[73] Assignee: Hughes Electronics Corporation, El Segundo, Calif.

[21] Appl. No.: 08/903,109

[22] Filed: Jul. 30, 1997

[51] Int. Cl.[7] .................................................. B64G 1/32
[52] U.S. Cl. ........................................................ 244/166
[58] Field of Search .................................. 244/164, 166; 701/13

[56] References Cited

U.S. PATENT DOCUMENTS

| | | | |
|---|---|---|---|
| 3,232,561 | 2/1966 | Adams | 244/166 |
| 3,429,524 | 2/1969 | Buckingham et al. | 244/166 |
| 4,582,277 | 4/1986 | Von Tiesenhausen | 244/161 |

OTHER PUBLICATIONS

Greene, Jack B., et al., "Force on a Magnetic Dipole", *American Journal of Physics*, Feb., 1971, vol. 39, pp. 172–175.

Vaidman, Lev, "Torque and Force on a Magnetic Dipole", *American Journal of Physics*, Oct., 1990, vol. 58, No. 10, pp. 978–983.

Brownstein, K.R., "Force Exerted on a Magnetic Dipole", *American Journal of Physics*, Oct., 1993, vol. 61, No. 10, pp. 940–941.

Boyer, Timothy H., et al., "The Force on a Magnetic Dipole", *American Journal of Physics*, Aug. 1988, vol. 56, No. 8, pp. 688–691.

Lebon, Benoit A., "Magnetic Propulsion along an Orbiting Grain Stream", *Journal of Spacecraft and Rockets*, vol. 23, Mar.–Apr., 1986, pp. 141–143.

Hnizdo, V., "Hidden Momentum and the Force on a Magnetic Dipole", *AMagnetic and Electrical Separation*, 1992, vol. 3, pp. 259–265.

*Primary Examiner*—Galen L. Barefoot
*Attorney, Agent, or Firm*—Georgann S. Grunebach; M. W. Sales

[57] ABSTRACT

Spacecraft maneuvers (e.g., orbit transferring, stationkeeping and attitude controlling) of a first spacecraft are realized with conventional force and torque generators (e.g., thrusters and momentum wheels). Spacecraft maneuvers of a second spacecraft are realized through magnetic interaction between the first and second spacecraft. In particular, a magnetic moment vector $m_1$ of a magnetic system of the first spacecraft and a magnetic moment vector $m_2$ of a magnetic system of the second spacecraft are adjusted to apply selected force vectors and torque vectors to the first and second spacecraft.

44 Claims, 7 Drawing Sheets

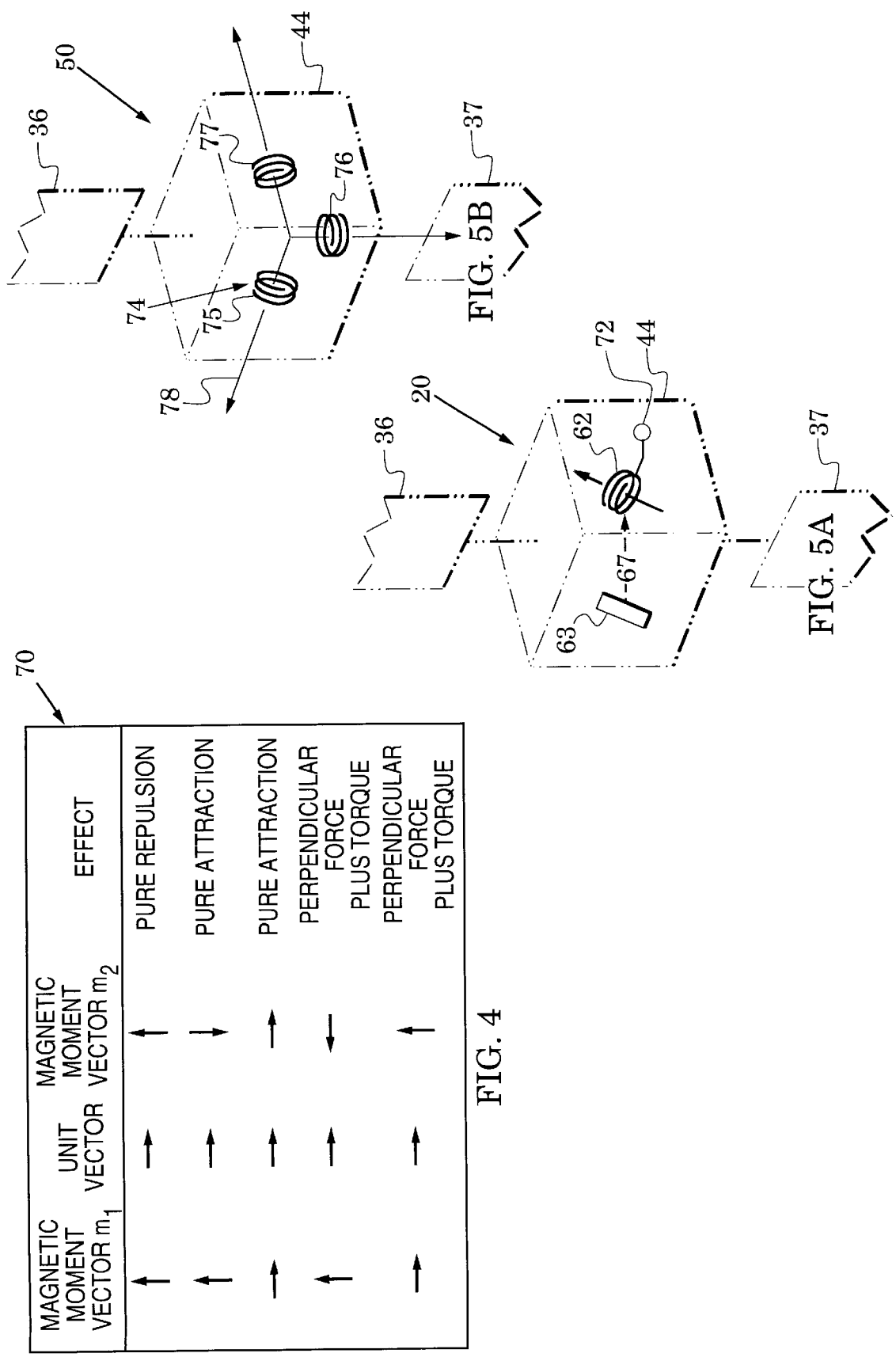

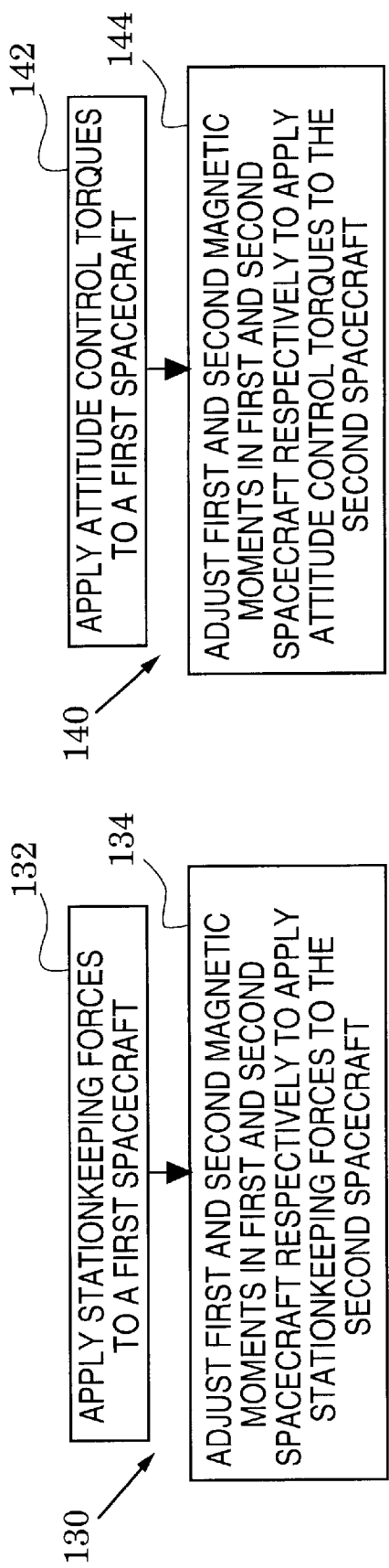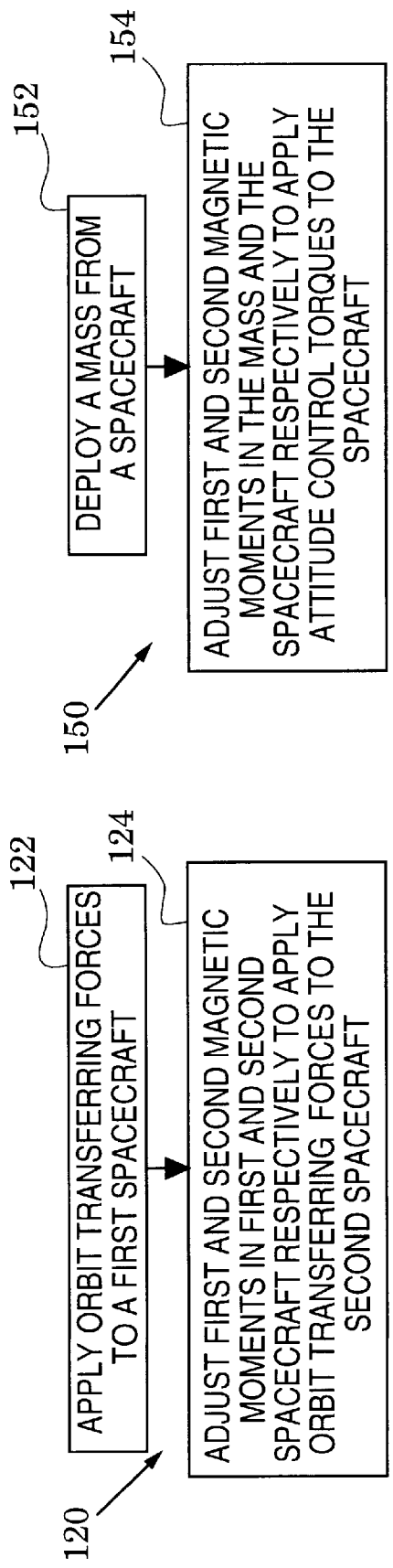

MAGNETIC SYSTEMS AND METHODS FOR REALIZING SPACECRAFT MANEUVERS

BACKGROUND OF THE INVENTION

1. Field of the Invention

The present invention relates generally to spacecraft and, more particularly, to spacecraft maneuvering.

2. Description of the Related Art

Spacecraft are directed through various maneuvers to guide them along a variety of celestial paths (e.g., interplanetary voyages and orbits around astronomical bodies such as the Earth) to perform a variety of functions (e.g., weather or planet surface monitoring, commercial communications and scientific observations). These spacecraft maneuvers include ones which initially place a spacecraft in an predetermined celestial path, ones which maintain a desired spacecraft station in the celestial path and ones which maintain a desired spacecraft attitude in the celestial path. In an exemplary case in which the celestial path is a geosynchronous Earth orbit, these spacecraft maneuvers are typically referred to as orbital transferring, stationkeeping and attitude controlling.

Spacecraft maneuvers are accomplished by the application of forces and torques to the spacecraft. Typically, orbital transferring and stationkeeeping are achieved by directing force vectors through the center of mass of spacecraft so as to obtain changes in spacecraft position without disturbing spacecraft attitude. In contrast, attitude controlling is typically achieved by spacing force vectors from the center of mass to thereby generate torque vectors which realize attitude changes.

Conventional spacecraft structures for application of spacecraft forces and torques include thrusters, momentum and reaction wheels, surfaces which receive solar pressure (e.g., solar cell arrays), extended masses which interact with ambient gravity gradients, mechanical inter-spacecraft control structures (e.g., mechanical arms) and magnetic torquing coils which interact with ambient magnetic fields (e.g., the Earth's magnetic field).

Although all of these control structures have been used to effect spacecraft maneuvers, each has characteristics that limit their usefulness. Thruster systems are typically bulky, heavy and expel propellant products which can coat and degrade sensitive spacecraft structures (e.g., electro-optical instruments and solar cell arrays). In addition, fuel is an expendable substance of limited supply and, hence, its lack routinely produces the effective end of useful spacecraft life. Momentum and reaction wheels are restricted to the application of torques and their momentum must be periodically "dumped" with other control structures (e.g., limited-fuel thrusters) when it approaches the design limit of the wheels.

Generation of spacecraft forces and spacecraft torques by use of solar pressure and ambient gravity gradients typically requires the arrangement or deployment of mechanical structures (e.g., selective rotation of solar cell arrays or extension of gravitational masses from the spacecraft on booms or tethers). Alternatively, generation of spacecraft forces and spacecraft torques can be effected with the limited quantity of thruster fuel.

Inter-spacecraft mechanical control structures are typically bulky and heavy which means they use a significant amount of spacecraft volume and weight (quantities which are always in short supply). Such structures can only be applied when the spacecraft spacing is less than the maximum reach of the control structures. In addition, direct-contact mechanical control may initiate a damaging electrostatic discharge because of spacecraft potential differences, may cause mechanical damage and may respond to electrical or mechanical failure by failing to uncouple the spacecrafts.

The application of magnetic fields to spacecraft maneuvers has typically been directed to the use of ambient magnetic fields (e.g., the Earth's magnetic field) or to the theoretical use of magnetic structures that have been previously distributed in orbit about a celestial body (e.g., see Lebon, Benoit A., "Magnetic Propulsion along an Orbiting Grain Stream", *Journal of Spacecraft and Rockets*, Vol. 23, March-April, 1986, pp. 141–143).

The forces and torques generated in magnetic structures by an ambient magnetic field have been generally described by many investigators (e.g., see Boyer, Timothy H., "The Force on a Magnetic Dipole", *American Journal of Physics*, August 1988, Vol. 56, No. 8, pp. 688–692; Brownstein, K. R., "Force Exerted on a Magnetic Dipole", *American Journal of Physics*, October 1993, Vol. 61, No. 10, pp. 940–941); Greene, Jack B., et al., "Force on a Magnetic Dipole", *American Journal of Physics*, February 1971, Vol. 39, pp. 172–175; Hnizdo,V., "Hidden Momentum and the Force on a Magnetic Dipole", *Magnetic and Electrical Separation*, 1992, Vol. 3, pp. 259–265; and Vaidman, Lev, "Torque and Force on a Magnetic Dipole", *American Journal of Physics*, October 1990, Vol. 58, No. 10, pp. 978–983).

Magnetic forces on neutrally charged objects are not induced by uniform magnetic fields. Accordingly, ambient magnetic fields cannot be used to generate forces on spacecraft because they are essentially uniform at the spatial scale of spacecraft. In addition, the generation of torques with an ambient magnetic field is limited in application because the direction of the ambient magnetic field gradient cannot be selected.

SUMMARY OF THE INVENTION

The present invention is directed to the generation and application of control forces and control torques to a plurality of spacecraft. This goal is achieved with the recognition that control forces and control torques can be applied between spacecraft by controlled magnetic interactions between the spacecraft. It is further recognized that these control forces and control torques can be selectively altered with appropriate orientations of magnetic fields and appropriate selection of magnetic field strengths.

In particular, if a first magnetic system of a first spacecraft has a magnetic moment vector $m_1$ and a second magnetic system of a second spacecraft has a second magnetic moment vector $m_2$, then a force vector $F_{12}$ on the first spacecraft and a force vector $F_{21}$ on the second spacecraft can be realized in accordance with equations 1 and 2 that are recited below in the detailed description. Similarly, a torque vector $T_{12}$ on the first spacecraft and a torque vector $T_{21}$ on the second spacecraft can be realized and an exemplary torque vector $T_{12}$ is recited below in the detailed description as equation 3.

The teachings of the invention can be used to perform a variety of novel spacecraft maneuvers. In exemplary maneuvers, a first spacecraft is transferred between orbits, stationkept and attitude controlled with application of conventional control structures (e.g., thrusters and momentum wheels) and a second spacecraft is transferred between orbits, stationkept and attitude controlled through magnetic interactions with the first spacecraft.

In addition to magnetic systems, a control system of the invention preferably includes a magnetic sensor and a controller which is responsive to the magnetic sensor, is coupled to select magnetic moment vectors and is programmed to generate force vectors and torque vectors in accordance with the equations recited below. The magnetic systems are realized with any conventional magnetic members (e.g., current carrying coils or magnets).

Spacecraft maneuvers are facilitated through the teachings of the invention. Forces and torques can be conventionally applied to a first spacecraft to effect a maneuver of the first spacecraft (e.g., orbit transferring, stationkeeping and attitude controlling). Subsequently, a magnetic field of the first spacecraft interacts with a magnetic system of a second spacecraft to apply forces and torques to effect a maneuver of the second spacecraft.

Accordingly, the first spacecraft can act as a "space-tug" which tows the second spacecraft into a celestial path, keeps the second spacecraft in a celestial path and realizes selected attitudes of the second spacecraft. Because only the first spacecraft need carry structures such as thrusters and momentum wheels, sensitive spacecraft surfaces of the second spacecraft are not exposed to contamination by thruster propulsion products. In addition, fields-of-view of the second spacecraft are enhanced and can be better utilized by payloads such as electro-optical instruments. Also, the second spacecraft never reaches the end of its useful life due to depletion of onboard fuel supply.

In the following descriptions of the invention which refer to a first and a second spacecraft, it should be understood that the teachings of the invention can be applied to greater numbers of spacecraft (e.g., each of a plurality of "first spacecraft" can exert a force $F_{21}$ and a torque $T_{21}$ on each of a plurality of "second spacecraft" and each of a plurality of "second spacecraft" can exert a force $F_{12}$ and a torque $T_{12}$ on each of a plurality of "first spacecraft"). It should be further understood that the term "force" refers to a vector quantity which tends to produce a linear motion change of an object and the term "torque" refers to a vector quantity which tends to produce rotation of an object.

The novel features of the invention are set forth with particularity in the appended claims. The invention will be best understood from the following description when read in conjunction with the accompanying drawings.

BRIEF DESCRIPTION OF THE DRAWINGS

FIG. 4 is a chart which illustrates exemplary orientations of the magnetic moments of FIG. 3;

FIG. 5A is a view of one of the spacecraft of FIG. 3 which illustrates an exemplary magnetic system;

FIG. 5B is a view similar to FIG. 5A which illustrates another exemplary magnetic system;

FIGS. 8A–8D are flow charts which illustrate other control methods of the invention.

DETAILED DESCRIPTION OF THE PREFERRED EMBODIMENTS

Figure 1:
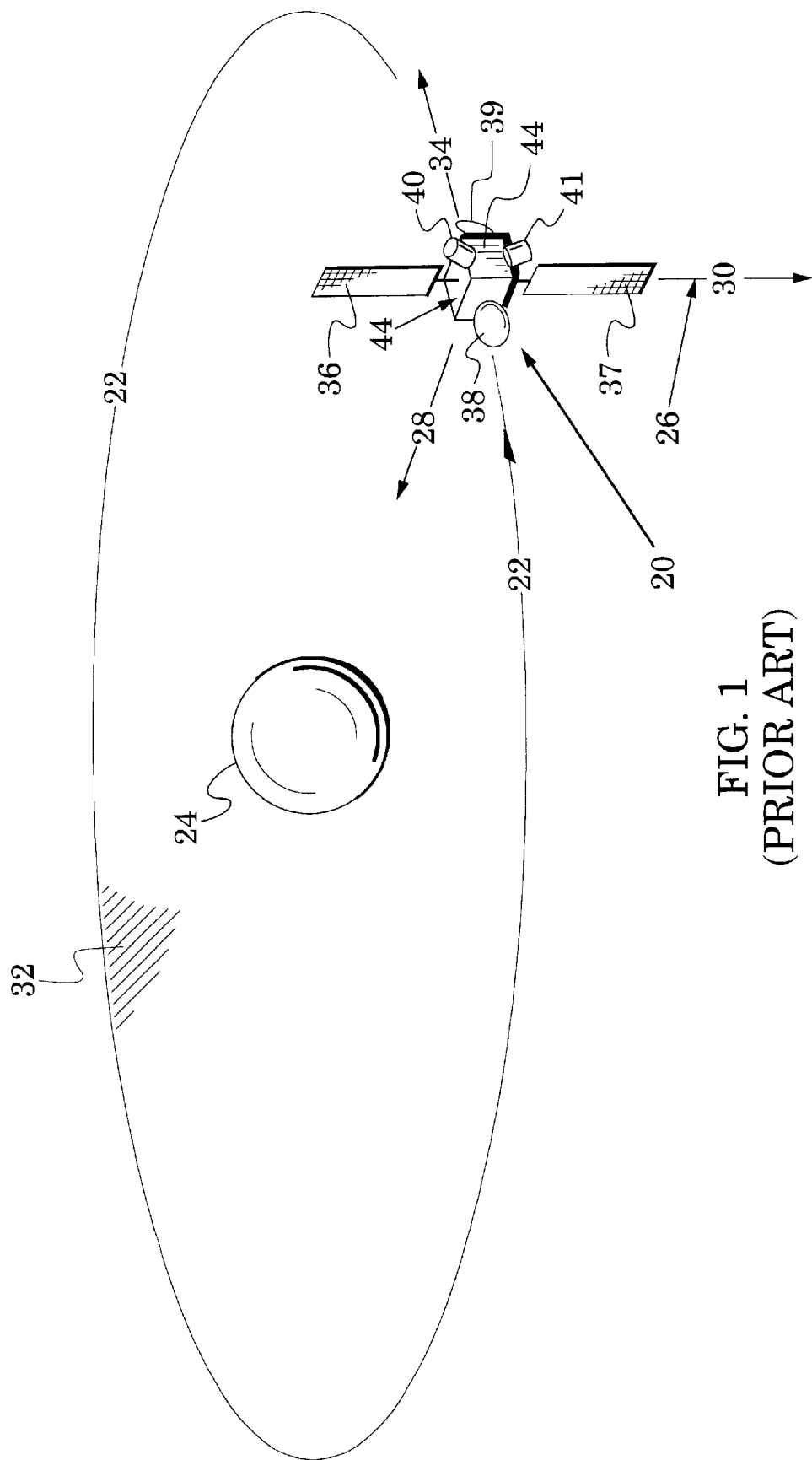
FIG. 1 is perspective view of a spacecraft in an orbital plane about a celestial body.

FIG. 1 illustrates a spacecraft 20 which is traveling along a celestial path. In this exemplary illustration, the celestial path is an orbit 22 about the Earth 24 and the spacecraft is a body-stabilized spacecraft whose attitude can be defined relative to an orthogonal coordinate system 26. The coordinate system 26 has an origin at the spacecraft's center of mass and includes a yaw axis 28 which is directed from the origin towards the center of the Earth 24. A pitch axis 30 is orthogonal to the spacecraft's orbital plane 32 and a roll axis 34 is aligned with the satellite's velocity vector.

Solar cell arrays 36 and 37 typically extend from the spacecraft so that they can rotate about some selected axis (frequently the pitch axis 30) to enhance their exposure to the Sun. Antennas (e.g., the antennas 38 and 39) are usually directed towards the Earth for communication and thrusters 40 and 41 are carried on the spacecraft's body 44 to facilitate stationkeeping and attitude control.

Figure 2:
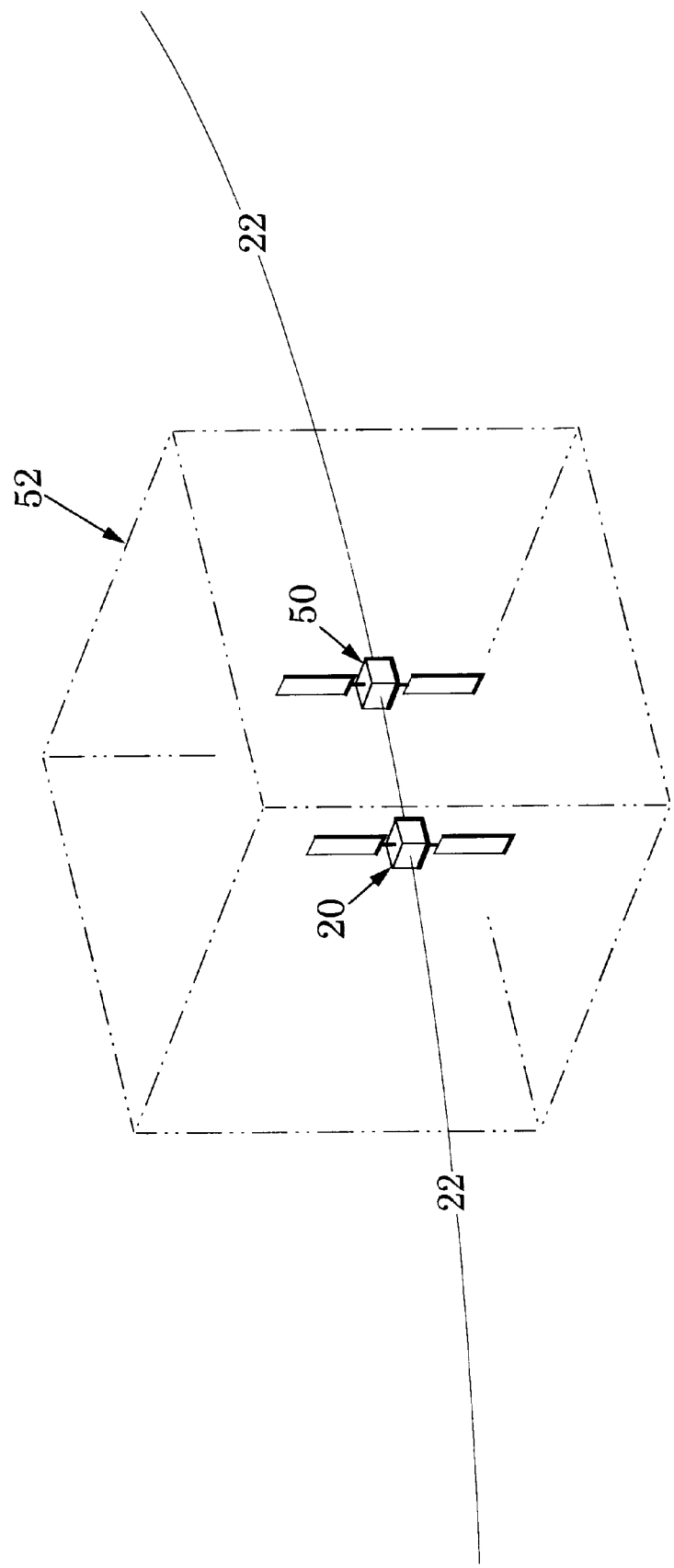
FIG. 2 is a simplified, perspective view of the spacecraft of FIG. 1 which shows it co-located with another spacecraft in an orbital box.

An exemplary use of the present invention applies to geosychronous satellites on station. To prevent conflict or collision with other spacecraft, the spacecraft 20 of FIG. 1 is typically restricted to movement within an orbital "box" which has a predetermined longitudinal location on the orbit 22. Orbital boxes are generally assigned to commercial or governmental entities which may sometimes be free to co-locate a plurality of spacecraft within an assigned box. For example, FIG. 2 illustrates the spacecraft 20 and a similar spacecraft 50 that are co-located within an orbital box 52 (details of the spacecraft 20 are not shown in FIG. 2 for simplicity of illustration).

If the spacecraft 20 and 50 are to be kept within the orbital box 52 and also kept safely spaced apart, a control system is required which can apply control forces to the spacecraft. Preferably, the control system can also apply control torques to the spacecraft 20 and 50 so that their attitudes can be selected to enhance their operation, e.g., to direct spacecraft antennas (38 and 39 in FIG. 1) at the Earth (24 in FIG. 1).

Figure 3:
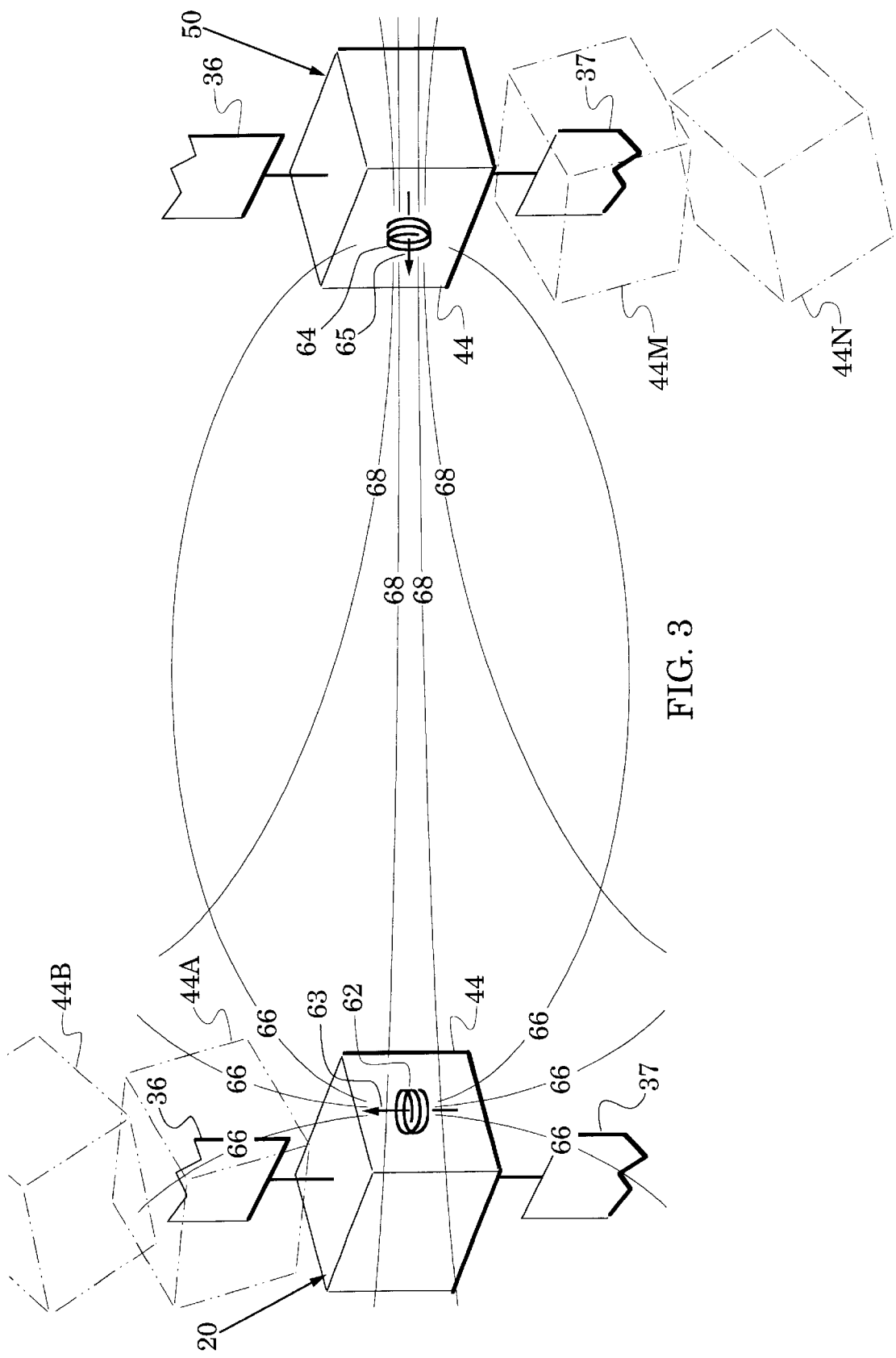
FIG. 3 is an enlarged view of bodies of the spacecraft of FIG. 3 which illustrates methods of the present invention for orienting magnetic moments to generate control forces and torques.

FIG. 3 is an enlarged view of the spacecraft 20 and 50 which illustrates a control system of the present invention. The system includes magnetic members 62 and 64 which are respectively positioned in the bodies 44 of the spacecraft 20 and 50. Although the teachings of the invention can be practiced with any magnetic members (e.g., magnets and current-carrying coils), the members 62 and 64 are each indicated to be current-carrying coils.

The magnetic members 62 and 64 have selectable magnetic moment vectors 63 and 65 whose direction and strength are respectively indicated by the orientation and length of their vector arrows. As is well known, a magnetic moment vector m is the ratio of the maximum torque $T_{max}$ exerted on a magnetic member to the strength B of a magnetic field in which the magnetic member is immersed (i.e., $m=T_{max}/B$). The maximum torque exists when the magnetic moment vector is orthogonal to the magnetic field. For example, the magnetic moment m of a coil of N turns and area A which carries a current I is given by m=NAI.

In the exemplary arrangement of FIG. 3, the magnetic moment vectors are arranged in an orthogonal relationship. In particular, the magnetic moment vector 63 of the magnetic member 62 is directed upwards and the magnetic moment vector 65 of the magnetic member 64 is directed towards the spacecraft 20 (i.e., directed to the left). Magnetic flux lines 66 from the magnetic member 62 project outward to envelope the magnetic member 64 (for clarity of illustration, discrete magnetic flux lines are used to indicate the presence of the magnetic field of magnetic members). Similarly, magnetic flux lines 68 from the magnetic member 64 project outward to envelope the magnetic member 62.

As a result of the orthogonal relationship between the magnetic moment vectors 63 and 65, forces are exerted on spacecraft 20 and 50 which cause them to accelerate respectively upward and downward. In addition, the orthogonal relationship exerts similar torques on the spacecraft 20 and 50 which causes similar rotations (e.g., counterclockwise when viewed from the top of FIG. 3). To illustrate this motion, two successive, broken-line positions 44A and 44B are shown for the body 44 of the spacecraft 20 and two successive, broken-line positions 44M and 44N are shown for the body 44 of the spacecraft 50.

The table 70 of FIG. 4 shows several exemplary arrangements of magnetic moment vectors 63 and 65 and the resulting forces and torques. In a first example of the table, side-by-side and parallel magnetic moment vectors generate pure repulsion forces between the magnetic members. In a second example, side-by-side and parallel but opposite magnetic moment vectors generate pure attraction forces between the magnetic members. In a third example, colinear and similarly-directed magnetic moment vectors generate pure attraction forces between the magnetic members. Although not shown, colinear and oppositely-directed magnetic moment vectors generate pure repulsion forces. The last two arrangement examples of the table 70 show that orthogonally-arranged magnetic moment vectors generate both forces and torques.

In particular, it has been determined that a force vector $F_{12}$ which is exerted on a first spacecraft that carries a magnetic moment vector $m_1$ by a second spacecraft that carries a magnetic moment vector $m_2$ is given by $$F_{12} = \frac{k}{r^4}\{(e_{12} \times m_1) \times m_2 + (e_{12} \times m_2) \times m_1 - 2e_{12}(m_1 \cdot m_2) + 5e_{12}(e_{12} \times m_1) \cdot (e_{12} \times m_2)\} \quad (1)$$

in units of Newtons and in which the constant $k=3\mu_o/4\pi=3.0\times10^{-7}$ Newton-Ampere$^{-2}$ ($\mu_o$ being the permeability of free space), r is a scalar which represents the separation distance between the two spacecraft, $e_{12}$ is a unit vector directed towards the first spacecraft from the second spacecraft, × represents a cross product (i.e., a vector product) operation and • represents a dot product (i.e., a scalar product) operation. A force vector $F_{21}$ exerted on the second spacecraft by the first spacecraft is given by $$F_{21} = -F_{12}. \quad (2)$$

In general, a torque vector $T_{12}$ which is exerted on the first spacecraft is not equal to a torque vector $T_{21}$ which is exerted on the second spacecraft. These torques can be calculated and an exemplary torque vector $T_{12}$ has been determined to be $$T_{12} = \frac{k}{3r^3}\{3(m_2 \cdot e_{12})(m_1 \times e_{12}) - (m_1 \times m_2)\} \quad (3)$$

in units of Newton-meter.

As is well known, a force vector urges a body to accelerate linearly in the direction of the force vector and a torque vector urges a body to accelerate its rotation about the vector in an angular direction given by the right hand rule (i.e., if the thumb of the right hand points in the direction of the torque vector, the fingers of the right hand indicate the urged rotation direction). The equations recited above (and the exemplary arrangements of the table 70 of FIG. 4) indicate that pure forces can be generated by the invention so that spacecraft can be maneuvered without disturbing their attitude. In addition, attitude-changing torques can be generated by the invention but they are accompanied by position-changing forces. However, these effects can be followed with the application of subsequent pure forces that restore an original position relationship. Although FIGS. 3 and 4 illustrate the teachings of the invention with reference to two spacecraft, these teachings are applicable to any number of spacecraft or to one spacecraft successively controlling a plurality of other spacecraft.

As an indication of scale, exemplary spacecraft magnetic torquing coils have magnetic moments in the range of 1000 Ampere-meter$^{-2}$. If a pair of spacecraft each carried a coil with this strength of magnetic moment, the magnetic moments were arranged as in the first arrangement of the table 70 of FIG. 4 and the two spacecraft were separated by 4 meters (i.e., r=4 meters), then $F_{12}=1.2\times10^{-3}$ Newtons. Alternatively, if the magnetic moments were arranged as in the last arrangement of the table 70 of FIG. 4, then $T_{12}=1.6\times10^{-3}$ Newton-meters.

These are small forces and torques which respectively decline with the fourth and third power of the separation distance r. However, they can be integrated over long time periods because of the typically long time durations of spacecraft travel (e.g., time in orbit). Accordingly, it is theorized that they can achieve forces comparable to those obtained with electrostatic ion thrusters and torques well above those obtained with typical ambient geomagnetic fields at the elevation of a geosynchronous orbit.

In FIG. 5A, the spacecraft 20 of FIG. 3 is modified to show that the magnetic member 62 can be carried on a gimbal so that it can be selectively directed in any direction. Because there are a great number of conventional gimbal structures, they are represented in FIG. 5A by a simple ball mount 72. Although the magnetic member 62 is indicated as a current-carrying coil, the coil can be replaced by a magnet 63 as indicated by a replacement arrow 67.

Alternatively, FIG. 5B illustrates that an equivalent magnetic system 74 can be formed with a plurality of magnetic members 75, 76 and 77 which are arranged so that their individual magnetic moments can form any composite magnetic moment in three-dimensional space. Preferably, the magnetic members are arranged in a orthogonal relationship. Because appropriate adjustments of the magnetic moments of these magnetic members can realize any magnetic moment, the need for movable magnetic members is avoided. For backup redundancy, a fourth magnetic member can be positioned so that it is not orthogonal to any of the magnetic members 75, 76 and 77. The teachings of the invention can be practiced with any of various magnetic member orientations that can define magnetic moments in three-dimensional space (e.g., four magnetic members arranged in a pyramidal shape).

Figure 6:
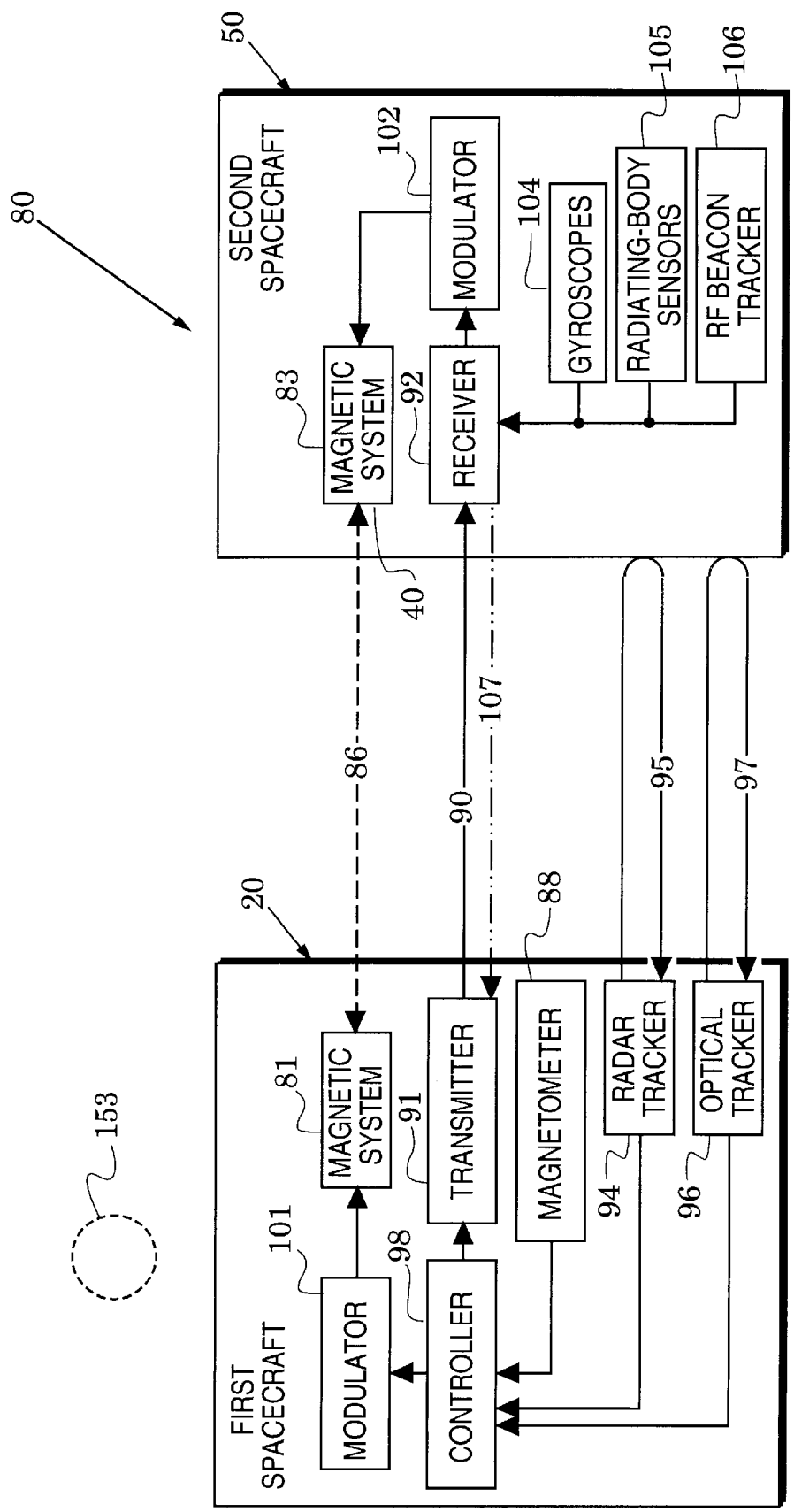
FIG. 6 is a block diagram of a control system of the present invention.

A spacecraft control system 80 of the invention is shown in FIG. 6. The system 80 includes magnetic systems 81 and 83 which are carried respectively in first and second spacecraft (e.g., the spacecraft 20 and 50 of FIG. 3). These magnetic systems may comprise, for example, the gimballed magnetic member 62 of FIG. 5A or the magnetic system 74 of FIG. 5B. Each of the magnetic systems 81 and 83 can interact with the magnetic field that is generated by the other of the magnetic systems. This magnetic interaction is symbolized in FIG. 6 by the broken line 86.

The first spacecraft 20 also carries a magnetometer 88 for sensing the magnetic fields of the magnetic systems 81 and

83. An exemplary magnetometer would include individual magnetometers arranged in an orthogonal relationship (similar to that of the magnetic system 74 of FIG. 3) or a magnetometer configured for three-axis sensing.

Commands to adjust the magnetic moment of the magnetic member 83 are communicated through a communication link 90 that includes a transmitter 91 in the spacecraft 20 and a receiver 92 in the spacecraft 50 with the magnetic moment of the magnetic system 83 being responsive to the receiver 92.

The separation distance between the first and second spacecraft is detected with a tracker system (e.g., a radar tracker 94 which detects reflected radar signals 95 or an optical tracker 96 which detects reflected optical signals 97 and/or the magnetometer 88). The tracker system can provide the separation distance r which was included in the equations recited above for determining forces $F_{12}$ and $F_{21}$ and torques $T_{12}$ and $T_{21}$.

A controller 98 (e.g., a microprocessor) is carried in the first spacecraft 20 to be responsive to inputs from the radar tracker 94 (or the optical tracker 96) and the magnetometer 88. In turn, the controller 98 sends commands to the magnetic system 81 and to the magnetic system 83 through the communication link 90

To enhance the ability of the control system 80 to distinguish between different magnetic fields, the magnetic members 81 and 83 can be modulated (e.g., pulsed). Accordingly, modulators 101 and 102 are inserted so that commands to the magnetic systems 81 and 83 are communicated through the modulators.

In operation of the control system 80, detected information about the magnetic fields of the magnetic systems 81 and 83 is communicated from the magnetometer 88 to the controller 98. If desired, the magnetic field detection is enhanced by modulating the magnetic fields via the modulators 101 and 102. Detected information concerning the separation distance between the spacecraft is communicated from the radar tracker 94 (or the optical tracker 96) to the controller 98.

The controller 98 can be preprogrammed to perform various spacecraft maneuvers, e.g., to maintain a fixed separation distance or to maintain a relative attitude between spacecraft. With inputs concerning the magnetic moments $m_1$ and $m_2$ and the separation distance r, the controller 98 can be programmed (in accordance with the force and torque equations recited above) to determine the forces and torques required to perform the programmed maneuvers. Alternatively, the controller 98 can be commanded (via a conventional data link to the spacecraft 20) to perform spacecraft maneuvers other than preprogrammed maneuvers.

Figure 7:
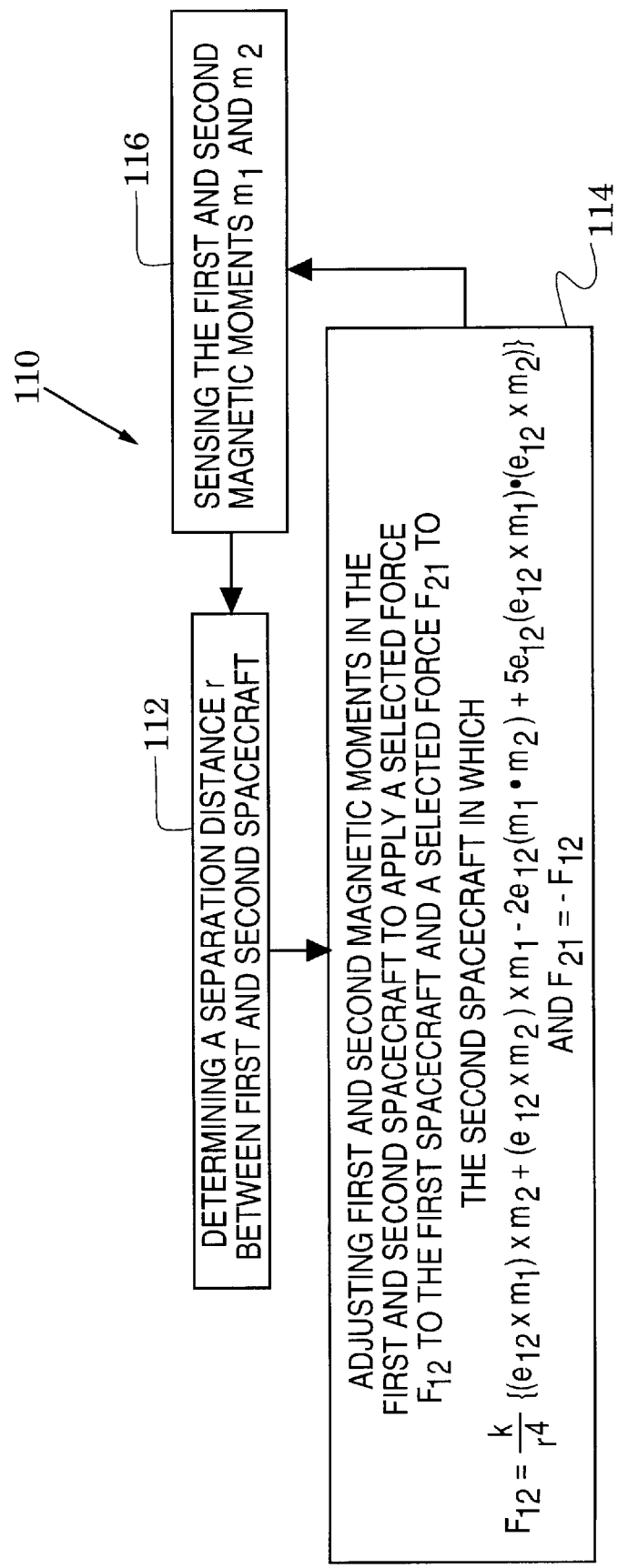
FIG. 7 is a flow chart which illustrates a control method in the control system of FIG. 6.

FIG. 7 illustrates a basic operational method 110 of the control system 80. In a first process step 112, the separation distance r between the spacecraft 20 and 50 is determined (e.g., with the optical tracker 96 of FIG. 6). In a second process step 114 the magnetic moments of the first and second magnetic systems 81 and 83 are adjusted to realize selected forces $F_{12}$ and $F_{21}$ (e.g., forces selected by preprogramming of the controller 98 or selected through a communication link to the spacecraft 20). In a feedback step 116, the first and second magnetic moments are sensed (e.g., by the magnetometer 88 of FIG. 6) and sent to the controller 88 to facilitate further force adjustments. A method similar to the method 110 is used to apply torques to the spacecraft.

In an operational mode of the control system 80 of FIG. 6, attitude information about the second spacecraft 50 can be sensed by conventional attitude sensors (e.g., gyroscopes 104 or radiating-body sensors 105 such as Sun sensors, Earth sensors and star sensors or radio frequency beacon trackers 106) and this information communicated to the controller 98. The communication can be over a data link (e.g., the transmitter 98 and the receiver 92 can be transceivers which establish a data link 107 from the second spacecraft to the first spacecraft). In this operational mode, the controller then sets the magnetic moments $m_1$ and $m_2$ to generate forces and torques that effect a selected spacecraft maneuver.

In another operational mode, the magnetic system 83 can be configured so that its magnetic moment $m_2$ is fixed relative to the second spacecraft 50. In this mode, the controller 98 determines torques which will selectively set the attitude of the magnetic moment $m_2$ and, hence, of the second spacecraft 50.

FIG. 8A illustrates a control method 120 of the invention. In a first process step 122, orbit transferring forces are applied to a first spacecraft, e.g., the spacecraft 20 of FIG. 6. In a second process step 124, first and second magnetic moments are adjusted respectively in the first spacecraft and in a second spacecraft to thereby apply orbit transferring forces to the second spacecraft.

In an application of this method, a first spacecraft generates orbit transferring forces conventionally (e.g., with thrusters). This spacecraft applies the orbit transferring forces to itself to move from one orbit to another (e.g., from a low Earth orbit to a geosynchronous orbit through an interim transfer orbit). Magnetic moment vectors are adjusted in this spacecraft and in one or more other spacecraft to apply orbit transferring forces to the other spacecraft. Essentially, the first spacecraft acts as a "space-tug" which drags the other "payload" spacecraft between orbits. Only the space-tug has to carry force generators such as thrusters. In the other spacecraft, space and weight typically required for thrusters can be devoted instead to payload.

FIG. 8B illustrates another control method 130 of the invention. In a first process step 132, stationkeeping forces are applied conventionally to a first spacecraft, e.g., the spacecraft 20 of FIG. 6. In a second process step 134, first and second magnetic moment vectors are adjusted respectively in the first spacecraft and in a second spacecraft to thereby apply stationkeeping forces to the second spacecraft.

FIG. 8C illustrates another control method 140 of the invention. In a first process step 142, attitude control torques are applied conventionally to a first spacecraft, e.g., with momentum wheels. In a second process step 144, first and second magnetic moment vectors are adjusted respectively in the first spacecraft and in a second spacecraft to thereby apply attitude control torques to the second spacecraft. In this method, only one spacecraft needs to carry conventional torque generators such as momentum wheels. In a variation of this method in which the second spacecraft does carry momentum wheels, attitude control torques can be applied via the first and second magnetic moments to facilitate momentum dumping of these momentum wheels.

FIG. 8D illustrates another control method 150 of the invention in which magnetic torque and force coupling between two bodies is used to augment the use of the two bodies as a gravity-gradient stabilization system. This gravity gradient concept can be used in the presence of an astronomical body's (e.g., planet's) gravitational field and removes the need for a hard mechanical connection between the two masses.

In a first process step 152, a mass, e.g., the broken-line mass 153 of FIG. 6, is deployed from a first spacecraft, e.g., the spacecraft 20 of FIG. 6. In a second process step 154, first and second magnetic moments are adjusted respectively in the mass 153 and in the spacecraft 20 to thereby apply attitude control torques to the second spacecraft. A simple line can be attached to the mass 153 to facilitate retrieval after completion of the attitude control maneuver.

The teachings of the invention facilitate spacecraft maneuvers. In particular, forces and torques can be conventionally applied to a first spacecraft to effect a maneuver and, subsequently, a magnetic interaction with a second spacecraft applies forces and torques that effect a similar maneuver of the second spacecraft.

Accordingly, the first spacecraft can act as a "space-tug" which tows the second spacecraft into a celestial path (e.g., a geosynchronous orbit). Alternatively, the first spacecraft can use thrusters to keep it in a station of a celestial path and magnetic field interaction keeps the second spacecraft in the same station. Similarly, the first spacecraft can use thrusters to realize a selected attitude and magnetic field interaction applies torques to realize a selected attitude of the second spacecraft. In all of these spacecraft maneuvers, only the first spacecraft need carry force and torque generators such as thrusters and momentum wheels.

The teachings of the invention also facilitate attitude control of a spacecraft by magnetic field interactions between the spacecraft and a deployed mass.

In a feature of the invention, sensitive spacecraft surfaces (e.g., solar cell arrays) of the second spacecraft are not exposed to contamination by thruster propulsion products. In another feature of the invention, fields-of-view of the second spacecraft are enhanced because the second spacecraft need not carry force and torque structures such as thrusters and momentum wheels. These enhanced fields-of-view can be utilized by payloads of the second spacecraft (e.g., electro-optical instruments).

The teachings of the invention are particularly suited to celestial environments (e.g., geosynchronous orbits, orbits about other planets, Moon orbits and interplanetary and interstellar paths) in which the strength of ambient magnetic fields is comparatively low. Furthermore, the practicality of this invention could improve as "room temperature" superconductivity technology improves.

Although descriptions of the invention have referred to a first and a second spacecraft, the second spacecraft can be a plurality of spacecraft. For example, the first spacecraft can act as a "space-tug" which sequentially tows a plurality of spacecraft into various celestial paths.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of applying control forces and control torques to spacecraft, comprising the steps of:
   from first and second spacecraft, respectively projecting first and second magnetic fields to magnetically interact wherein said first and second magnetic fields are respectively represented by first and second magnetic moment vectors; and
   orienting said first and second magnetic fields to realize a selected arrangement of said first and second magnetic moment vectors and thereby a corresponding application of at least one of a selected control force and a selected control torque to each of said first and second spacecraft.

2. The method of claim 1, wherein said selected arrangement places said first and second magnetic moment vectors in a parallel and similarly-directed relationship and said corresponding application applies a repulsion force between said first and second spacecraft.

3. The method of claim 1, further including the step of changing a field strength of at least one of said first and second magnetic fields to selectively alter at least one of said control force and said control torque.

4. The method of claim 1, wherein said selected arrangement places said first and second magnetic moment vectors in a parallel and oppositely-directed relationship and said corresponding application applies an attraction force between said first and second spacecraft.

5. The method of claim 1, wherein said selected arrangement places said first and second magnetic moment vectors in a colinear and similarly-directed relationship and said corresponding application applies an attraction force between said first and second spacecraft.

6. The method of claim 1, wherein said selected arrangement places said first and second magnetic moment vectors in a colinear and oppositely-directed relationship and said corresponding application applies a repulsion force between said first and second spacecraft.

7. The method of claim 1, wherein said selected arrangement places said first and second magnetic moment vectors in an orthogonal relationship and said corresponding application applies oppositely-directed forces and similarly-directed torques to said first and second spacecraft.

8. A method of applying control forces and control torques to spacecraft, comprising the steps of:
   projecting a first magnetic field from a first magnetic system of a first spacecraft to magnetically interact with a second magnetic system of a second spacecraft and thereby apply at least one of a control force and a control torque to said second spacecraft; and
   projecting a second magnetic field from said second magnetic system to magnetically interact with said first magnetic system and thereby apply at least one of a control force and a control torque to said first spacecraft;
   wherein:
     said first magnetic system has a magnetic moment vector $m_1$ and
     said second magnetic system has a second magnetic moment vector $m_2$;
   and further including the step of adjusting at least one of said first magnetic moment vector $m_1$ and said second magnetic moment vector $m_2$ to realize a selected force vector $F_{12}$ on said first spacecraft and a selected force vector $F_{21}$ on said second spacecraft in accordance with the following equations:
   a) $F_{12}=(k/r^4)\{(e_{12}\times m_1)\times m_2+(e_{12}\times m_2)\times m_1)-2e_{12}(m_1\bullet m_2)+5e_{12}(e_{12}\times m_1)\bullet(e_{12}\times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, $\times$ is a vector product operation and $\bullet$ is a scalar product operation; and
   b) $F_{21}=-F_{12}$.

9. The method of claim 8, wherein said constant k substantially equals $3\times10^{-7}$ Newton-Ampere$^{-2}$.

10. The method of claim 8, wherein at least one of said first and second magnetic systems includes a coil and said adjusting step includes the step of directing a current through said coil to realize a respective magnetic moment.

11. The method of claim 8, further including the step of sensing a selected one of said first and second magnetic fields to facilitate said adjusting step.

12. The method of claim 11, further including the step of modulating said selected magnetic field to facilitate said sensing step.

13. The method of claim 8, further including the step of transmitting commands between said first and second spacecraft to facilitate said adjusting step.

14. The method of claim 8, wherein said adjusting step includes the step of directing electrical currents through a plurality of coils to realize a respective magnetic moment.

15. The method of claim 14, wherein each of said coils is configured about an axis and said directing step includes the step of arranging the axes of said coils in an orthogonal relationship.

16. The method of claim 8, wherein at least one of said first and second magnetic systems includes a magnet.

17. A method of applying control forces and control torques to spacecraft, comprising the steps of:
projecting a first magnetic field from a first magnetic system of a first spacecraft to magnetically interact with a second magnetic system of a second spacecraft and thereby apply at least one of a control force and a control torque to said second spacecraft; and
projecting a second magnetic field from said second magnetic system to magnetically interact with said first magnetic system and thereby apply at least one of a control force and a control torque to said first spacecraft;
wherein:
said first magnetic system has a magnetic moment vector $m_1$ and
said second magnetic system has a second magnetic moment vector $m_2$;
and further including the step of adjusting at least one of said first magnetic moment vector $m_1$ and said second magnetic moment vector $m_2$ to realize a selected torque vector $T_{12}$ on said first spacecraft and a selected torque vector $T_{21}$ on said second spacecraft wherein an exemplary torque vector is given by $T_{12}=(k/3r^3)\{3(m_2 \cdot e_{12})(m_1 \times e_{12})-(m_1 \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation.

18. A method of maneuvering first and second spacecraft, comprising the steps of:
applying at least one of a first maneuvering force and a first maneuvering torque to said first spacecraft to realize a maneuver of said first spacecraft;
from said first and second spacecraft, projecting first and second magnetic fields to magnetically interact wherein said first and second magnetic fields are respectively represented by first and second magnetic moment vectors; and
orienting said first and second magnetic fields to realize a selected arrangement of said first and second magnetic moment vectors and thereby a corresponding application of at least one of a selected second maneuvering force and a selected second maneuvering torque to said second spacecraft to said second spacecraft to realize a maneuver of said second spacecraft.

19. The method of claim 18, wherein said applying step includes the step of firing a thruster of said first spacecraft.

20. The method of claim 18, wherein said selected arrangement places said first and second magnetic moment vectors in a parallel and similarly-directed relationship and said corresponding application applies a repulsion force between said first and second spacecraft.

21. The method of claim 18, further including the step of changing a field strength of at least one of said first and second magnetic fields to selectively alter at least one of said second maneuvering force and said second maneuvering torque.

22. The method of claim 18, wherein:
said applying step includes the step of choosing at least one of said first maneuvering force and said first maneuvering torque to place said first spacecraft in a selected celestial path; and
said projecting step includes the step of choosing at least one of said second maneuvering force and said second maneuvering torque to place said second spacecraft in said celestial path.

23. The method of claim 18, wherein:
said applying step includes the step of choosing at least one of said first maneuvering force and said first maneuvering torque to keep said first spacecraft in a selected station of a celestial path; and
said projecting step includes the step of choosing at least one of said second maneuvering force and said second maneuvering torque to keep said second spacecraft in said station.

24. The method of claim 18, wherein:
said applying step includes the step of choosing at least one of said first maneuvering force and said first maneuvering torque to realize a first attitude of said first spacecraft; and
said projecting step includes the step of choosing at least one of said second maneuvering force and said second maneuvering torque to realize a second attitude of said second spacecraft.

25. A method of maneuvering first and second spacecraft, comprising the steps of:
applying at least one of a first maneuvering force and a first maneuvering torque to said first spacecraft to realize a maneuver of said first spacecraft; and
projecting a magnetic field from a first magnetic system of said first spacecraft to magnetically interact with a second magnetic system of a second spacecraft and thereby apply at least one of a second maneuvering force and a second maneuvering torque to said second spacecraft to realize a maneuver of said second spacecraft;
wherein:
said first magnetic system has a magnetic moment vector $m_1$ and
said second magnetic system has a second magnetic moment vector $m_2$;
and wherein said projecting step includes the step of adjusting at least one of said first magnetic moment vector $m_1$ and said second magnetic moment vector $m_2$ to realize a selected force vector $F_{12}$ on said first spacecraft and a selected force vector $F_{21}$ on said second spacecraft in accordance with the following equations:
a) $F_{12}=(k/r^4)\{(e_{12} \times m_1) \times m_2 + (e_{12} \times m_2) \times m_1 - 2e_{12}(m_1 \cdot m_2) + 5e_{12}(e_{12} \times m_1) \cdot (e_{12} \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation; and b) $F_{21} = -F_{12}$.

26. A method of maneuvering first and second spacecraft, comprising the steps of:

applying at least one of a first maneuvering force and a first maneuvering torque to said first spacecraft to realize a maneuver of said first spacecraft; and projecting a magnetic field from a first magnetic system of said first spacecraft to magnetically interact with a second magnetic system of a second spacecraft and thereby apply at least one of a second maneuvering force and a second maneuvering torque to said second spacecraft to realize a maneuver of said second spacecraft;

wherein:

said first magnetic system has a magnetic moment vector $m_1$ and said second magnetic system has a second magnetic moment vector $m_2$;

and wherein said projecting step includes the step of adjusting at least one of said first magnetic moment vector $m_1$ and said second magnetic moment vector $m_2$ to realize a selected torque vector $T_{12}$ on said first spacecraft and a selected torque vector $T_{21}$ on said second spacecraft wherein an exemplary torque vector is given by $T_{12}=(k/3r^3)\{3(m_2 \cdot e_{12})(m_1 \times e_{12})-(m_1 \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation.

27. A method of controlling the attitude of a spacecraft, comprising the steps of:

spacing a mass from said spacecraft;

from said spacecraft and said mass, respectively projecting first and second magnetic fields to magnetically interact wherein said first and second magnetic fields are respectively represented by first and second magnetic moment vectors; and orienting said first and second magnetic fields to realize a selected arrangement of said first and second magnetic moment vectors and thereby a corresponding application of a selected control torque to said mass.

28. A method of controlling the attitude of a spacecraft, comprising the steps of:

spacing a mass from said spacecraft;

projecting a first magnetic field from a first magnetic system of said mass to magnetically interact with a second magnetic system of said spacecraft and thereby apply a control torque to said spacecraft; and projecting a second magnetic field from said second magnetic system to magnetically interact with said first magnetic system and thereby apply a control torque to said mass;

wherein:

said first magnetic system has a magnetic moment vector $m_1$; and said second magnetic system has a second magnetic moment vector $m_2$;

and wherein said projecting steps include the step of adjusting at least one of said first magnetic moment vector $m_1$ and said second magnetic moment vector $m_2$ to realize a selected torque vector $T_{12}$ on said first spacecraft and a selected torque vector $T_{21}$ on said second spacecraft wherein an exemplary torque vector is given by $T_{12}=(k/3r^3)\{3(m_2 \cdot e_{12})(m_1 \times e_{12})-(m_1 \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation.

29. A spacecraft control system for controlling positions and attitudes of first and second spacecraft, comprising:

a first magnetic system carried by said first spacecraft and projecting a first magnetic field that has a first magnetic moment vector $m_1$; and a second magnetic system carried by said second spacecraft and projecting a second magnetic field that has a second magnetic moment vector $m_2$;

wherein said first and second magnetic systems are configured so that said first and second magnetic fields magnetically interact to realize a selected arrangement of said first and second magnetic moment vectors and thereby a corresponding application of at least one of a selected control force and a selected control torque to each of said first and second spacecraft.

30. The spacecraft control system of claim 29, wherein at least one of said first and second magnetic systems includes a current-carrying coil.

31. The spacecraft control system of claim 29, wherein at least one of said first and second magnetic systems includes a plurality of coils.

32. The spacecraft control system of claim 31, Wherein each of said coils is configured about an axis and the axes of said coils are arranged in an orthogonal relationship.

33. The spacecraft control system of claim 29, wherein at least one of said first and second magnetic systems includes a magnet.

34. A spacecraft control system for controlling positions and attitudes of first and second spacecraft, comprising:

a first magnetic system carried by said first spacecraft and having a first magnetic moment vector $m_1$; and a second magnetic system carried by said second spacecraft and having a second magnetic moment vector $m_2$;

wherein said first magnetic system is configured to generate a first magnetic field that interacts with said second magnetic system to apply at least one of a control force and a control torque to said second spacecraft; and said second magnetic system is configured to generate a second magnetic field that interacts with said first magnetic system to apply at least one of a control force and a control torque to said first spacecraft;

wherein the magnetic moment vector of at least a variable one of said first and second magnetic systems is selectable and further including:

a magnetic sensor carried by said first spacecraft and configured to be sensitive to said second magnetic moment vector $m_2$; and a controller which is carried by said first spacecraft, is responsive to said magnetic sensor, is coupled to select said variable magnetic moment vector and is programmed to generate a force vector $F_{12}$ on said first spacecraft and a force vector $F_{21}$ on said second spacecraft in accordance with the following equations:

a) $F_{12}=(k/r^4)\{(e_{12} \times m_1) \times m_2+(e_{12} \times m_2) \times m_1)-2e_{12}(m_1 \cdot m_2)+5e_{12}(e_{12} \times m_1) \cdot (e_{12} \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation; and b) $F_{21}=-F_{12}$.

35. The spacecraft control system of claim 34, wherein said magnetic moment vector $m_2$ is selectably responsive to control signals and further including a communication system configured to communicate said control signals from said controller to said second magnetic system.

36. The spacecraft control system of claim 35, wherein said communication system includes:
   a transmitter in said first spacecraft which is responsive to said controller; and
   a receiver in said second spacecraft which is responsive to said transmitter and which is coupled to said second magnetic system.

37. The spacecraft control system of claim 34, further including a tracking system carried in said first spacecraft and configured to sense said separation distance.

38. The spacecraft control system of claim 37, wherein said tracking system is a radar tracking system.

39. The spacecraft control system of claim 37, wherein said tracking system is an optical tracking system.

40. The spacecraft control system of claim 34, wherein said magnetic sensor includes at least one magnetometer.

41. A spacecraft control system for controlling positions and attitudes of first and second spacecraft, comprising:
   a first magnetic system carried by said first spacecraft and having a first magnetic moment vector $m_1$; and
   a second magnetic system carried by said second spacecraft and having a second magnetic moment vector $m_2$;
   wherein said first magnetic system is configured to generate a first magnetic field that interacts with said second magnetic system to apply at least one of a control force and a control torque to said second spacecraft; and
   said second magnetic system is configured to generate a second magnetic field that interacts with said first magnetic system to apply at least one of a control force and a control torque to said first spacecraft;
   wherein the magnetic moment vector of at least a variable one of said first and second magnetic systems is selectable and further including:
      a magnetic sensor carried by said first spacecraft and configured to be sensitive to said second magnetic moment vector m2; and
      a controller which is carried by said first spacecraft, is responsive to said magnetic sensor, is coupled to select said variable magnetic moment vector and is programmed to generate a torque vector $T_{12}$ on said first spacecraft and a torque vector $F_{21}$ on said second spacecraft wherein an exemplary torque vector is given by $T_{12}=(k/3r^3)\{3(m_2 \cdot e_{12})(m_1 \times e_{12})-(m_1 \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation.

42. A space craft system with controllable spacecraft positions and spacecraft attitudes, comprising:
   a first spacecraft;
   a first magnetic system carried by said first spacecraft and projecting a first magnetic field that has a first magnetic moment vector $m_1$;
   a second spacecraft; and
   a second magnetic system carried by said second spacecraft and projecting a second magnetic field that has a second magnetic moment vector $m_2$;
   wherein said first and second magnetic systems are configured so that said first and second magnetic fields magnetically interact to realize a selected arrangement of said first and second magnetic moment vectors and thereby a corresponding application of at least one of a selected control force and a selected control torque to each of said first and second spacecraft.

43. A spacecraft system with controllable spacecraft positions and spacecraft attitudes, comprising:
   a first spacecraft;
   a first magnetic system carried by said first spacecraft and having a first magnetic moment vector $m_1$;
   a second spacecraft; and
   a second magnetic system carried by said second spacecraft and having a second magnetic moment vector $m_2$;
   wherein said first magnetic system is configured to generate a first magnetic field that interacts with said second magnetic system to apply at least one of a control force and a control torque to said second spacecraft; and
   said second magnetic system is configured to generate a second magnetic field that interacts with said first magnetic system to apply at least one of a control force and a control torque to said first spacecraft;
   wherein the magnetic moment vector of at least a variable one of said first and second magnetic systems is selectable and further including:
      a magnetic sensor carried by said first spacecraft and configured to be sensitive to said second magnetic moment vector $m_2$; and
      a controller which is carried by said first spacecraft, is responsive to said magnetic sensor, is coupled to select said variable magnetic moment vector and is programmed to generate a force vector $F_{12}$ on said first spacecraft and a force vector $F_{21}$ on said second spacecraft in accordance with the following equations:
         a) $F_{12}=(k/r^4)\{(e_{12} \times m_1) \times m_2+(e_{12} \times m_2) \times m_1)-2e_{12}(m_1 \cdot m_2)+5e_{12}(e_{12} \times m_1) \cdot (e_{12} \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation; and
         b) $F_{21}=-F_{12}$.

44. A spacecraft system with controllable spacecraft positions and spacecraft attitudes, comprising:
   a first spacecraft;
   a first magnetic system carried by said first spacecraft and having a first magnetic moment vector $m_1$;
   a second spacecraft; and
   a second magnetic system carried by said second spacecraft and having a second magnetic moment vector $m_2$;
   wherein said first magnetic system is configured to generate a first magnetic field that interacts with said second magnetic system to apply at least one of a control force and a control torque to said second spacecraft; and
   said second magnetic system is configured to generate a second magnetic field that interacts with said first magnetic system to apply at least one of a control force and a control torque to said first spacecraft;

wherein the magnetic moment vector of at least a variable one of said first and second magnetic systems is selectable and further including:

a magnetic sensor carried by said first spacecraft and configured to be sensitive to said second magnetic moment vector $m_2$; and a controller which is carried by said first spacecraft, is responsive to said magnetic sensor, is coupled to select said variable magnetic moment vector and is programmed to generate a torque vector $T_{12}$ on said first spacecraft and a torque vector $T_{21}$ on said second spacecraft wherein an exemplary torque vector is given by $T_{12}=(k/3r^3)\{3(m_2 \cdot e_{12})(m_1 \times e_{12})-(m_1 \times m_2)\}$ in which a constant k is equal to $3\mu_o/4\pi$, r is a scalar which indicates a distance between said first and second spacecraft, $e_{12}$ is a unit vector directed towards the first spacecraft from the second spacecraft, × is a vector product operation and • is a scalar product operation.

* * * * *